Sept. 15, 1959

A. F. PEARCE ET AL

ELECTRON DISCHARGE DEVICES AND ELECTRICAL RENSONATORS THEREFOR

Filed May 16, 1955

2,904,719

INVENTORS

A. F. Pearce

K. H. Kreuchen by Stewart Downing & Seebold

ATTORNEYS

United States Patent Office 2,904,719
Patented Sept. 15, 1959

2,904,719

ELECTRON DISCHARGE DEVICES AND ELECTRICAL RESONATORS THEREFOR

Albert Frederick Pearce, Gerrards Cross, and Karl Heinz Kreuchen, Hounslow, England, assignors to Electric & Musical Industries Limited, Hayes, Middlesex, England, a company of Great Britain Application May 16, 1955, Serial No. 508,656

Claims priority, application Great Britain May 19, 1954

11 Claims. (Cl. 315—5.19)

The present invention relates to reflex klystrons for operation in a harmonic mode.

The physical dimensions of a resonator determines the resonant frequency thereof and it will be appreciated, therefore, that in general the higher the frequency the smaller the dimension of the resonator. In order to overcome the practical difficulties in the manufacture of resonators for operation at very high frequency, it has become the practice to operate the resonator in a mode which is not its fundamental mode (or mode of lowest frequency). The mode used is sometimes referred to as a "harmonic mode," although the frequency is not necessarily related in an integral way with that of the fundamental mode. Thus for a given frequency of operation, the dimensions of a resonator operating in a harmonic mode are larger than those for a fundamental mode resonator.

It is known that the power loss in a resonator of this kind is greater than in a resonator operating at the same frequency in its lowest or fundamental mode, and for this reason the performance of the device is impaired. As an example, with a reflex klystron this will be apparent from the lower power output obtained and a smaller electronic tuning range (usually taken between the points of half maximum power).

It is therefore an object of the present invention to improve the performance of devices with associated resonators when operating in a harmonic mode.

According to the invention there is provided in a circuit arrangement comprising a klystron having electronic tuning over a voltage range and a resonator having a capacity gap and means for projecting an electron beam through said gap to cause said resonator to resonate in a harmonic mode and to set up a voltage nodal surface between said gap and the surrounding wall of said resonator, the provision of a conducting member fixed within said resonator to form a capacity there-across at a position in the region of said nodal surface, thereby to extend the frequency range of said electronic tuning within said voltage range.

Figure 1:
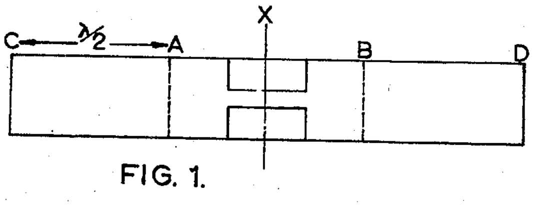
Figures 2, 3, 4, 5:
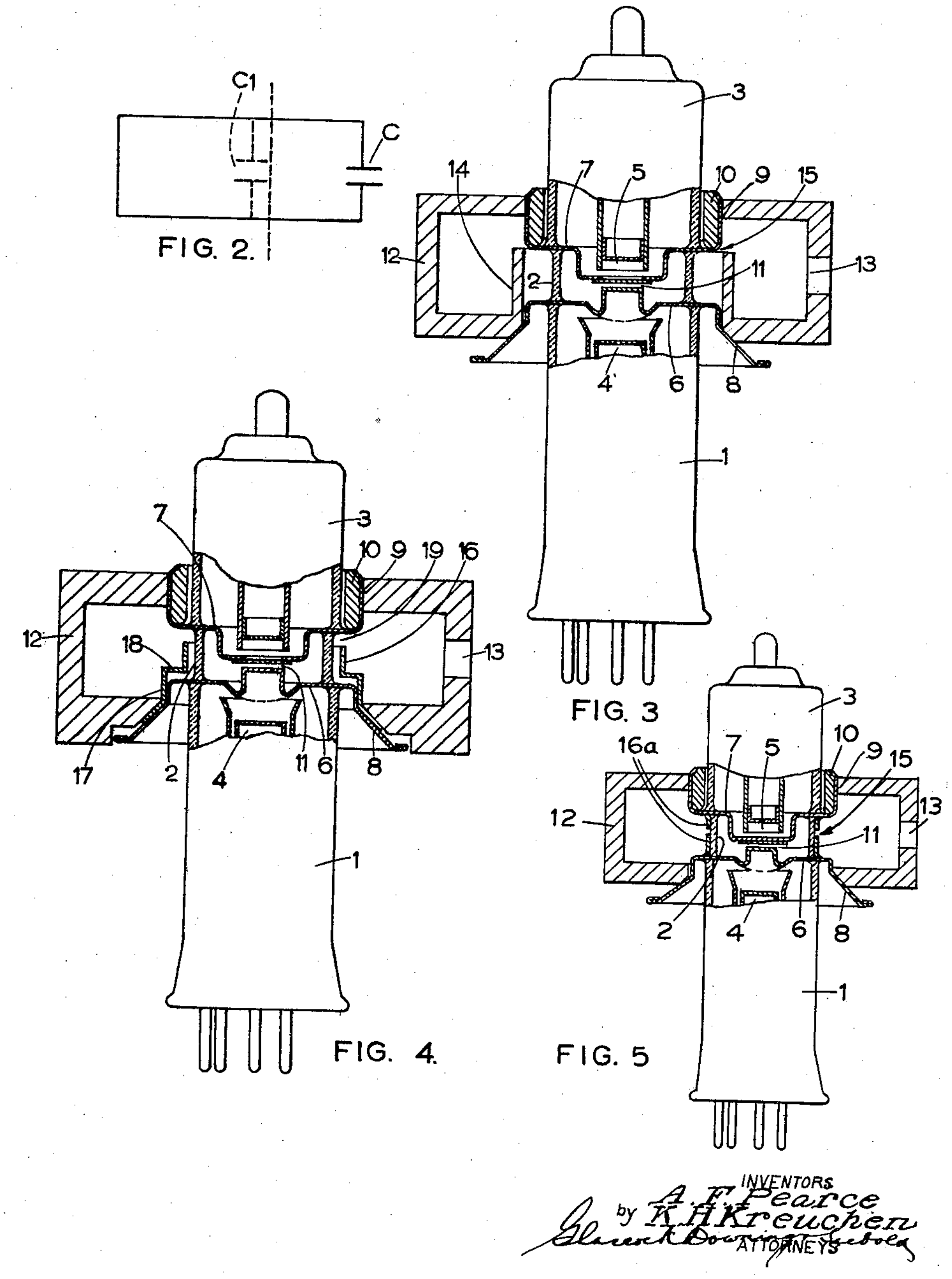

In order that the said invention may be clearly understood and readily carried into effect, various embodiments will now be described with reference to the accompanying drawings, in which:

Figure 1 illustrates a harmonic resonator of known form,

Figure 2 illustrates an analogous transmission line circuit of the resonator of Figure 1 with modifications showing the principles of the invention, Figure 3 illustrates an electron discharge device and associated resonator embodying the invention, Figure 4 illustrates a modified construction of the arrangement shown in Figure 3, and Figure 5 illustrates an electron discharge device and associated resonator showing a modified form of the invention.

Referring to Figure 1, a simple harmonic resonator having axial symmetry is shown. It is a radial line resonator and in operation it will be assumed that the resonator is excited to oscillation by an electron beam projected along the line X through apertures in the resonator, the beam being velocity modulated at the frequency at which excitation of the resonator is desired. At this frequency a voltage nodal surface of approximately cylindrical form with a diameter AB is set up in the resonator, and the position of this nodal surface is indicated by dotted lines. The distances AC and BD are approximately one half wavelength. It will, of course, be understood that with slight changes in the operating frequency i.e. on tuning, so will the position of this nodal surface change and for this reason in the following description the position of the nodal surface will mean the position of this surface at the particular frequency for which the resonator is designed. If the resonator is not symmetrical about the electron gap then the nodal surface will not be cylindrical but may take up a conical form.

Resonators of this kind are used with discharge devices such as klystrons and more particularly with devices of the disc seal type where the frequency is such that a fundamental cavity would be so small as to cause practical difficulties in manufacture. With such devices the diameter of the portion of the glass envelope between the disc seals is usually chosen so as to be approximately equal to the diameter of the nodal surface AB so as to minimise dielectric losses and it thus follows that a glass wall of cylindrical construction may substantially coincide with this nodal surface.

In Figure 2 a well known transmission line circuit analogy for the resonator of Figure 1 shown, in which the capacity of the gap through which the electron beam passes is illustrated at C.

In the figure a dotted line is shown to represent the position of the nodal surface at A in Figure 1. If a capacity loading is applied across the resonator on the beam side of this nodal surface then as far as the gap is concerned this will appear as a pure capacity whereas if a similar capacity loading is provided outside this nodal surface then it appears to the gap as an inductance. To reduce the changes of admittance of the gap with frequency to a minimum, the change of conductance and susceptance with frequency must be decreased and this can be obtained with a suitable capacity loading arranged in the resonator outside the voltage nodal surface and such a capacity is illustrated in broken lines at C1 in Figure 2.

This principle is made use of in the present invention by disposing a conductive member in the resonator in such a position as to provide capacity loading of the resonator whereby the electronic tuning range of the device operating with the resonator is substantially increased. The expression "electronic tuning range" as used in this specification and in the claims is intended to mean the frequency range over which the device can be tuned electronically without reducing the output below half power.

Practical examples of the invention will now be described with reference to Figures 3 and 4 which illustrate reflex klystrons of the disc seal type associated with a suitable external resonator.

Referring to Figure 3 the klystron which is of known type comprises a glass envelope constructed from three tubular wall portions 1, 2 and 3. An electron gun 4 for producing a beam of electrons directed axially of the device is provided within the portion 1 and a reflector electrode 5 is arranged within the portion 3 and facing the gun 4. Extending across and to the outside of the envelope are two electrodes 6 and 7 of disc form these electrodes being hermetically sealed to the envelope portions 1 and 3 and also to the envelope portion 2 which maintains them spaced apart at the required distance. The electrode 6 is shaped to provide an upstanding central portion having a beam passing aperture, and in the example shown this aperture is covered with a grid to increase the coupling to the beam. Preferably the grid is of honeycomb formation arranged so as to present a minimum interception area for the beam passing axially through the aperture. The portion of the electrode 6 which extends outside the envelope is shaped to provide an electrical contact making member 8 of conical form and is strengthened at its free end by a radially extending flange. The electrode 7 is formed with a central depressed portion into which the reflector electrode 5 extends and is provided with a central beam passing aperture containing a grid of similar form to that provided in the electrode 6. The portion of the electrode 7 which extends outside the envelope is formed into a tubular electrical contact making element 9 re-inforced by a ring 10. The central portions of the electrodes 6 and 7 facing each other define a gap 11.

The device is plugged into a cavity 12 of circular form, the extension of the electrodes 6 and 7 making electrical contact with the transverse walls of the cavity as shown. Power is extracted from the cavity 12 by any suitable means such as by the aperture 13. A tubular conducting member 14 is secured to the lower wall of the cavity 13 and extends upwardly therefrom so as to provide an annular gap 15 which provides a capacity which loads the resonator. The physical dimensions of the member 14 and also its position in the cavity 12 will determine the capacity loading it provides on the resonator.

The shape of the electrodes 6 and 7 will cause the electric field conditions at least in the region from the gap 11 to the voltage nodal position to be slightly asymmetric i.e. tilted slightly with respect to the beam axis and for this reason it is found that the capacity gap 15 should be arranged towards the reflector side of the cavity 12 as shown. The conducting member 14 is shown in Figure 3 between the node and the outer antinode of the resonator and for the purposes of the invention where mention is made of positioning the member 14 outside of the node this positioning is intended to include all positions away from the node towards the antinode. It will be understood the capacity effect on the resonator can be changed over a wide range by making the member 14 of suitable dimensions and arranging it at different distances from the nodal surface, although it has been found that in practice the efficiency of the arrangement tends to decrease when the member 14 is positioned closer to the antinode by a distance less than $\lambda/8$. As aforesaid, when the position of the voltage node is referred to, the position of the node for the designed frequency of the resonator is meant. The same is true of reference to the position of the voltage antinode.

The dimensions of the cavity 12 will depend on the frequency band over which it is desired that the device should oscillate and although the present invention is only primarily concerned with the electronic tuning range it will be understood that the cavity 12 may also be provided with mechanical tuning means in known manner such as by the insertion therein of a plunger of dielectric material so as to vary the overall tuning range of the arrangement.

To provide a practical example the arrangement shown in Figure 3 may be arranged to oscillate over a range of from 7,500–8,500 mc./s. if a reflex klystron valve type R5222 also known as CV2346 manufactured and sold by EMI Valves Ltd., Ruislip, England is associated with a circular cavity 12 having the following internal dimensions. With a diameter 1.450 inch and an axial length of .406 inch the device will oscillate at 7,500 mc./s. With the conducting member 14 formed of brass of .035 inch thickness and an axial length of .280 inch and arranged to provide a gap of 0.5 mm. between the inner edge of the member 14 and the adjacent surface of the electrode 7 an electronic tuning range of 40–50 mc./s. can be obtained by varying the voltage of the reflector 4 over a range of 20–30 volts with +350 volts on the resonator with respect to the cathode of the gun 4.

To give a comparison of the improvement obtained by the addition of the member 14 a similar device mounted in a cavity without the member 14, with the cavity dimensions readjusted so as to give the same frequency, provides only an electronic tuning range of 20–25 mc./s. with the same voltage change on the reflector 4.

In Figure 4 a device and cavity similar to that in Figure 3 is shown and for this reason they are given the same reference numerals and are to be taken to be constructed in the manner already described.

In the arrangement shown in Figure 4 a different constructional form of the conducting member is provided and it comprises a first cylindrical portion 16 joined to a second cylindrical portion 17 of a greater diameter by a radial flange 18. The end of the cylinder 17 remote from the flange 18 is flared out and this flared out portion is arranged to be of such dimensions that it fits closely over the conical surface of the contact member 8. In view of the dimensions of the member formed by the cylinders 16 and 17 compared with the projecting portions of the electrodes 6 and 7 it is necessary to construct the member formed by 16 and 17 in sections or to provide a longitudinal cut in the member so that it can be mounted by expanding the member so that it passes over the tubular element 9 and thereafter compressing it so that it takes up its required position on conical portion 8. It is preferable when employing a conducting member of this construction to weld the flared portion thereof to the conical portion 8 of electrode 6 so that it forms an integral part of the valve. The axial length of the conducting member is such that an annular capacity gap 19 is provided between the end of the cylinder 16 and the adjacent surface of the external portion of the electrode 7, the capacity so formed imposing a loading on the resonator.

It is of course possible with certain frequency ranges where the outer surface of wall 2 is outside the position of the nodal surface, that the cylinders 16 of Figure 4 will make direct contact with the outer surface of this wall and under such conditions the conducting member may be provided as illustrated at 16*a* in Figure 5 by an electrically conducting coating such as metallising applied directly to this outer wall surface 2 of the device. A metallising process such as evaporating silver in vacuo may be employed, the metal film so formed being subsequently thickened by electro-plating. The provision of the capacity gap 15 between the two portions of the resonator separated by this conducting member may be arranged for by employing a suitable mask during the evaporation of the metal.

The capacity gap between the conducting member and the electrode 7 can take a form other than an open annulus and for example may be provided by a series of apertures or arcuate slots.

The dimensions for a practical arrangement of the conducting member disclosed in Figure 4 are as follows. The member is constructed of 0.010 inch brass so that the cylinder 16 has an inner diameter of .525 inch with an axial length including the thickness of the flange 18 of 0.120 inch, the inner diameter of the cylinder 17 being 0.734 inch with an axial length of 0.10 inch the flared portion corresponding in dimensions with the mating surface of the cone 8.

For operating this arrangement over a range of 8,500–10,000 mc./s. a R5222 valve is employed associated with a cavity of 1.40 inch internal diameter and an axial length of .406 inch for operation at 9,200 mc./s. With this arrangement an electronic tuning range of 40–50 mc./s. can be obtained with a change in reflector volts of 20–30 whereas with a similar arrangement in which the conducting screen is omitted the electronic tuning range is only 20–25 mc./s.

It will be understood that the invention is not confined to cavity resonators of circular shape but can be applied to resonators having other shapes.

What we claim is:

1. In a circuit arrangement including a reflex klystron having means for varying the voltage applied to the reflecting electrode of said klystron to effect electronic tuning of said klystron over a voltage range, the provision of a reflex klystron comprising a resonator having spaced oppositely disposed walls joined by a peripheral wall and a capacity gap across said oppositely disposed walls, means for projecting an electron beam through said gap to cause said resonator to resonate in a harmonic mode and to set up a voltage nodal surface encircling said gap and intermediate said gap and the peripheral wall of said resonator, the provision of means capacity loading said resonator across said oppositely disposed walls and disposed beyond said nodal surface in a direction away from said gap so that said capacity loading appears at said gap as an inductance thereby to extend the frequency range of said electronic tuning within said voltage range.

2. In a circuit arrangement including a reflex klystron having means for varying the voltage applied to the reflecting electrode of said klystron to effect electronic tuning of said klystron over a voltage range, the provision of a reflex klystron comprising a portion of its resonator within the evacuated envelope of the device and a portion of said resonator comprising spaced oppositely disposed walls joined by a peripheral wall disposed external of said envelope, said resonator portion within said envelope having a capacity gap, means for projecting an electron beam through said gap to cause said resonator to operate in a harmonic mode and to set up a voltage nodal surface encircling said gap and intermediate said gap and the peripheral wall of the external portion of said resonator, and means capacity loading said resonator across said external oppositely disposed walls and disposed beyond said nodal surface in a direction away from said gap so that said capacity loading appears at said gap as an inductance thereby to extend the frequency range of said electronic tuning within said voltage range.

3. In a circuit arrangement including a reflex klystron having means for varying the voltage applied to the reflecting electrode of said klystron to effect electronic tuning of said klystron over a voltage range, the provision of a reflex klystron comprising a pair of apertured disc like metal electrodes spaced apart to define an electron passing gap said electrodes extending transversely through a tubular wall of the envelope of the device, and coupled externally to spaced oppositely disposed walls joined by a peripheral wall to form therewith a resonator, means for projecting an electron beam through said gap to cause said resonator to resonate in a harmonic mode and to set up a voltage nodal surface encircling said gap and intermediate said gap and the peripheral wall of said conducting body and means capacity loading said resonator disposed external of said device and beyond said nodal surface in a direction away from said gap so that said capacity loading appears at said gap as an inductance thereby to extend the frequency range of said electronic tuning within said voltage range.

4. In a circuit arrangement according to claim 3 wherein said means capacity loading said resonator comprises an electrically conducting coating applied to the external surface of the envelope wall lying between said disc like electrodes and an opening in said coating for the transfer of energy from said device.

5. In a circuit arrangement according to claim 3 wherein the means capacity loading said resonator comprises an electrically conducting tubular metal member provided as a fixed wall extending from one of said oppositely disposed walls towards the other of said oppositely disposed walls and an opening for the transfer of energy from said device beyond said fixed wall.

6. In a circuit arrangement according to claim 3 wherein the means capacity loading said resonator comprises a metal cylinder secured in electrically conducting connection to the external portion of one of said disc electrodes and extending towards the external portion of said other disc electrode and an opening for the transfer of energy from said device beyond said cylinder.

7. A reflex klystron device comprising a resonator having spaced oppositely disposed walls joined by a peripheral wall a capacity gap and means for projecting an electron beam through said gap to cause said resonator to resonate in an harmonic mode and set up a voltage nodal surface encircling said gap and intermediate said gap and the peripheral wall of the resonator, means capacity loading said resonator across said oppositely disposed walls disposed at a position in said resonator beyond said nodal surface in a direction away from said gap so that with said resonator operating in an harmonic mode said capacity loading of said resonator appears at said gap as an inductance.

8. A reflex klystron comprising a portion of its resonator including a capacity gap within the evacuated envelope of the device and a portion of its resonator comprising spaced oppositely disposed walls joined by a peripheral wall disposed external of said device and means for projecting an electron beam through said gap to cause said resonator to operate in an harmonic mode and to set up a voltage nodal surface encircling said gap and intermediate said gap and the peripheral wall of the external portion of said resonator, means capacity loading said resonator across said external oppositely disposed walls disposed at a position in said resonator beyond said nodal surface in a direction away from said gap so that with said resonator operating in an harmonic mode said capacity loading of said resonator appears at said gap as an inductance.

9. A reflex klystron according to claim 8 in which the resonator portion within said envelope is provided by a pair of disc like electrodes projecting outside said envelope and spaced apart by an annular insulating wall of said envelope wherein said capacity loading said resonator comprises an electrically conducting coating applied to the external surface of the wall of said envelope between the external portions of said electrodes and an opening in said coating for the transfer of energy from said device.

10. A reflex klystron according to claim 8 wherein the means capacity loading said resonator comprises an electrically conducting tubular metal member provided as a fixed wall extending from one of said oppositely disposed walls towards the other of said oppositely disposed walls and an opening for the transfer of energy from said device beyond said fixed wall.

11. A reflex klystron according to claim 10 in which the resonator portion within said envelope is provided by a pair of disc like electrodes projecting outside said envelope spaced apart by an insulating wall of said envelope wherein said capacity loading of said resonator comprises a metal cylinder secured in electrically conducting connection to the external portion of one of said disc electrodes and extending towards the external portion of said other disc electrode and an opening for the transfer of energy from said device beyond said cylinder.

References Cited in the file of this patent

UNITED STATES PATENTS

| | | |
|---|---|---|
| 2,237,878 | Haeff | Apr. 8, 1941 |
| 2,239,421 | Haeff | Apr. 22, 1941 |
| 2,281,717 | Samuel | May 5, 1942 |
| 2,515,997 | Haeff | July 18, 1950 |
| 2,699,519 | Bruck | Jan. 11, 1955 |
| 2,750,531 | Sterling | June 12, 1956 |
| 2,813,997 | McArthur | Nov. 19, 1957 |